United States Patent [19]
McKenney et al.

[11] 3,987,659
[45] Oct. 26, 1976

[54] APPARATUS FOR TESTING SHOCK ABSORBERS

[75] Inventors: John D. McKenney, South Laguna; William H. Conway, Hacienda Heights, both of Calif.

[73] Assignees: John D. McKenney, South Laguna; William H. Conway, Hacienda Heights, both of Calif. ; part interest to each

[22] Filed: Feb. 18, 1975

[21] Appl. No.: 550,613

Related U.S. Application Data

[63] Continuation-in-part of Ser. No. 377,510, July 9, 1973, Pat. No. 3,877,289.

[52] U.S. Cl. .................................................. 73/11
[51] Int. Cl.² ........................................ G01M 17/04
[58] Field of Search ........................ 73/11, 71.7, 146

[56] References Cited
UNITED STATES PATENTS

| | | | |
|---|---|---|---|
| 3,313,142 | 4/1967 | Lackman | 73/11 |
| 3,642,081 | 2/1972 | Hebert | 177/211 X |
| 3,774,439 | 11/1973 | Emerson | 73/11 |

FOREIGN PATENTS OR APPLICATIONS

228,834  8/1963  Austria .................................. 73/146

*Primary Examiner*—Charles A. Ruehl
*Attorney, Agent, or Firm*—Fulwider, Patton, Rieber, Lee & Utecht

[57] ABSTRACT

A shock absorber testing apparatus comprising a ramp shaped to excite a particular wheel of an automobile at a frequency bandpass intermediate the fundamental frequency of the automobile spring-mass system and the fundamental frequency of unsprung elements of the suspension, measured by strain gages disposed on the ramp sensing ramp deformation due to the wheel loading as the wheel is passed thereover, and including switch means discriminating between the front and rear wheels selecting alternate storage circuits receiving the respective strain gage reading associated with each passing of the wheel. In one further embodiment, the storage circuits include peak detectors connected to the strain gages on each side of the ramp and means for comparing the peak detector outputs for producing a signal indicative of the difference therebetween.

13 Claims, 7 Drawing Figures

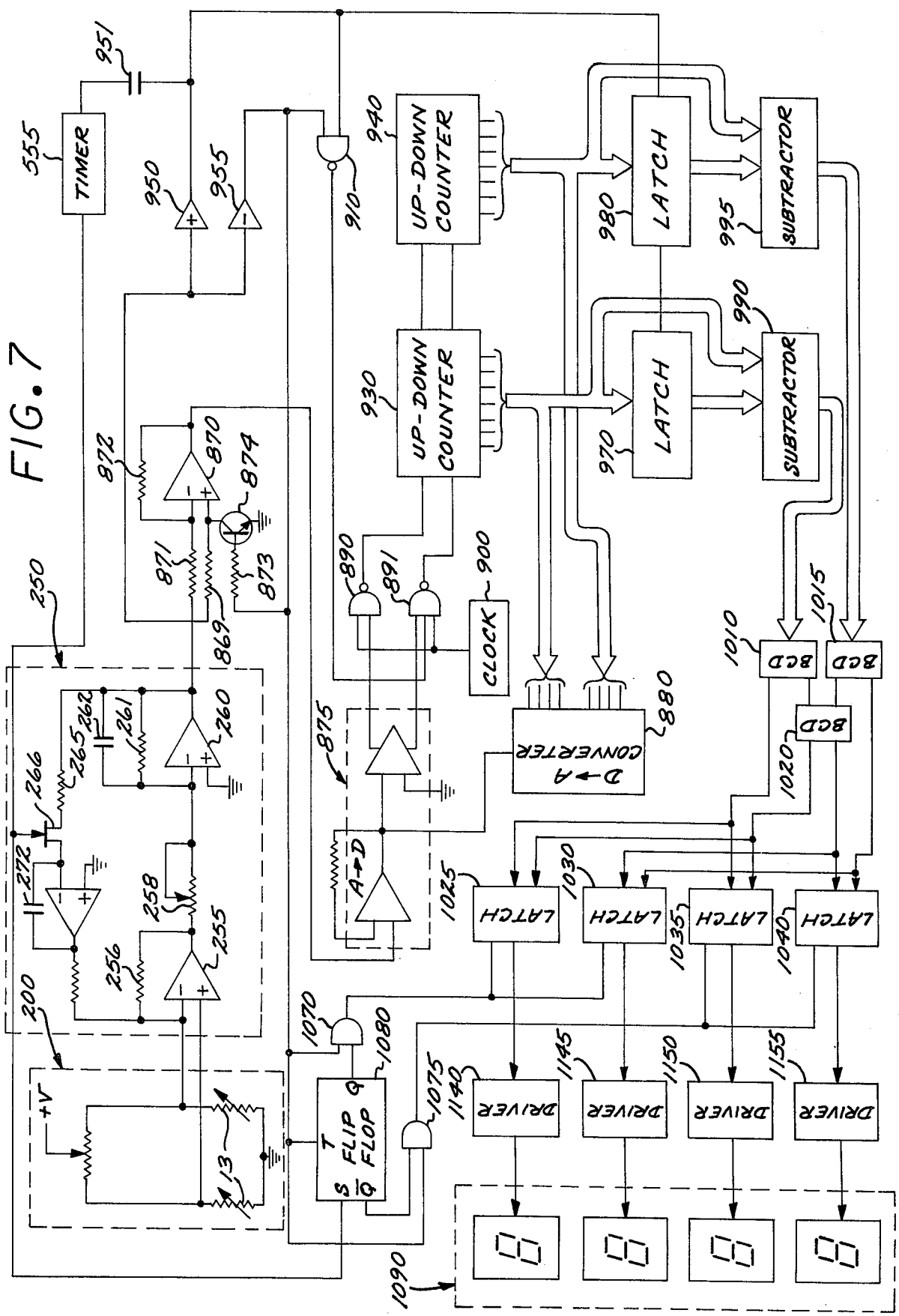

APPARATUS FOR TESTING SHOCK ABSORBERS

CROSS-REFERENCE TO RELATED APPLICATION

The present application is a continuation-in-part of U.S. Ser. No. 377,510, filed July 9, 1973, for METHOD AND APPARATUS FOR TESTING SHOCK ABSORBERS, now U.S. Pat. No. 3,877,289. The benefit of the earlier filing date is claimed for the subject matter common to both applications.

BACKGROUND OF THE INVENTION

1. Field of the Invention

The present invention relates to measurement apparatus, and more particularly to apparatus for measuring the damping performance of shock absorbers directly on a vehicle.

2. Descripton of the Prior Art:

The mechanics of damping of a automobile shock absorber are typically complex being designed to accommodate a wide range of suspension activity and any manual methods of testing of the nonlinear behavior thereof is highly subjective and often produces erroneous conclusions. Thus the effectiveness of automobile shock absorbers is typically hard to ascertain either by visual inspection or manual testing and numerous mechanical test procedures have been proposed in the past for measuring the damping performance thereof. Heretofore such testing procedures almost always required the removal of the shock absorber from the vehicle in which it is installed since only in such separated condition could the damping performance of the shock absorbers be accurately measured. Furthermore, the shock absorbers on the vehicle function in close association with various other suspension elements which in themselves are often non-linear, thus any measurement of the shock absorber performance must necessarily decouple or compensate for the various contributions to the dynamics of motion of the compound spring structure of the suspension. Such shock absorbers are typically included as part of the automative equipment covered by the general sellers' warranty and since many idiosyncratic opinions are possible as to the quality of the ride at any level of suspension activity a positive method of identifying the functioning of the shock absorber has been quite bothersome in the past. It is also generally recognized that faulty shock absorbers can seriously degrade the handling characteristics of a vehicle and therefore influence the safety of operation. A positive and convenient means for identifying such faulty shock absorbers in vehicle safety inspections is therefore greatly needed at present.

Heretofore most prior art devices would produce a convincing reading of shock absorber effectiveness only after a considerable amount of labor had been expended, i.e. only after the shock absorber had been removed from the car and tested by conventional testing devices. This particular problem has presented significant labor costs in the post-sale services and therefore is a substantial cost item for the automobile manufacture. Other heretofore proposed apparatus which provides a direct reading of shock absorber quality is typically complex, requiring large amounts of external power to excite the automobile, and is therefore expensive to produce and operate.

SUMMARY OF THE INVENTION

Accordingly, it is the general purpose and object of the present invention to provide a shock absorber testing apparatus which when driven over induces a predetermined transient into the suspension of an automobile and measures the loading response thereto. Other objects of the invention are to provide means for indirectly measuring the response coefficients of an automobile suspension which isolate the damping parameter of the shock absorber from the dynamics of the suspension and which furthermore do so without removal of the shock absorber from the suspension. Further objects of the invention are to provide for measurement apparatus which is generally adaptable to most automobile configurations, i.e. which does not have to be modified to mate with a particular type of suspension or weight of vehicle.

Briefly these and other objects are accomplished within the present invention by providing a ramp structure which is conformed to produce a predetermined excitation of the automobile suspension as the automobile is driven thereover. Specifically it is intended that the ramp be generally sinusoidal in shape, being further compensated in shaping to augment the impulse loss due to the loading deformation of the tire. The shape of the ramp is thus conformed to a geometric configuration which when driven over at a preselected low speed range, such as 8–12 m.p.h., excites the suspension at a particular frequency selected to be above the fundamental mode of the automobile and suspension spring-mass system. The ramp comprises structure which includes a loading and unloading section extending from either side of a central fulcrum along planes substantially defining sections of a sine wave, said sections terminating in tangential end sections in a plane above the fulcrum pivot. The deformation of the sections, as they are loaded by a wheel of an automobile driven thereover, is converted to a change in electrical resistance through conventional strain gages. The strain gages are combined in paired complement for each section both for the loading and the unloading sides of the ramp and the combined reading thereof is transmitted to a selected peak detecting system for each wheel. The peak detectors store the peak loading on both sections of the ramp as a complementary positive and negative reading for the corresponding sections of the ramp. The difference in loading between the sections of the ramp thus provides a reading of damping effectiveness of the shock absorber. The central fulcrum of the ramp provides further isolation between the loading and the unloading sections, extending beyond the plane including the section ends to allow the ramp to rock thereabout. As a result of this loading and unloading of the suspension, a reactive loading and unloading of the ramp sections is produced where the front or loading section of the ramp will produce a determinable higher dynamic reading than the rear or unloading section when the shock absorber is operating properly. In this context, it is to be noted that the proper operation of a shock absorber is to resist, in a nonlinear manner, the rate of deformation of the suspension elements and therefore increase the force necessary to deform it while resisting the force associated with the return. Since the impulse generated by the ramp shape is of a frequency spectrum much higher than the fundamental frequency of the suspended vehicle, the effect is to attenuate strongly the motion of the vehicle body itself.

Thus the vehicle body functions as the reference platform against which the suspension is deformed. Included further in the invention is a switching means which upon passing of the front wheel switches over from a first to a second peak detector to separate the loading associated with each wheel.

BRIEF DESCRIPTION OF THE DRAWINGS

FIG. 7 is a circuit schematic utilizing digital circuit elements to perform the functions of the circuit shown in FIG. 6.

DESCRIPTION OF THE SPECIFIC EMBODIMENTS

The present invention is directed at apparatus which simultaneously imposes an impulsive load to one wheel of an automobile and measures the reactive loading to the impulse developed by the wheel on the apparatus. The fundamental concept of the invention is to measure the forces on a shaped ramp when driven over at speeds which produce excitation frequencies above the fundamental resonance of the automobile spring-mass system. Thus it is the effective components, i.e., the wheel, relative the frame of the automobile which is registered in terms of loading on the ramp. More specifically, the invention measures the unsprung mass acceleration force, suspension system joint friction effects, the spring force and the shock absorber force. The shape of the ramp, the speed and the dynamic characteristics of the suspension system combine to result in almost equal spring forces on front and rear faces of the ramp. Also at these speeds, the shock asorber retraction and extension rates are high so that damping forces much larger than those generated by joint friction occur.

Figure 1:
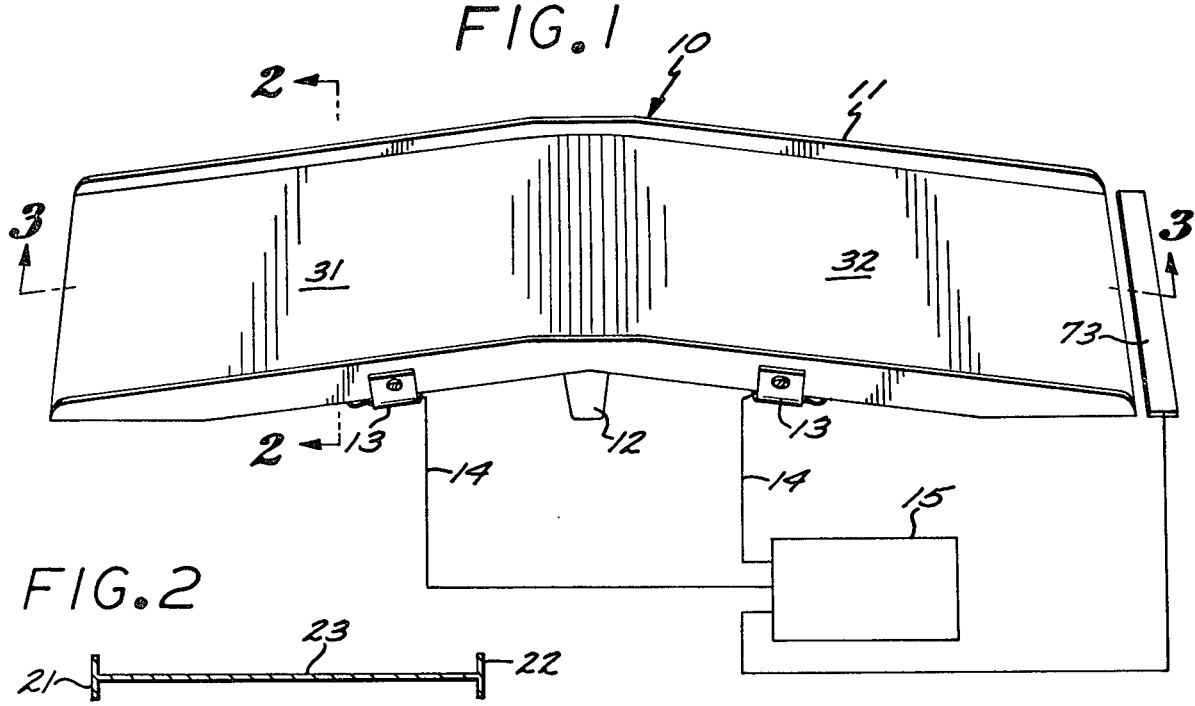
FIG. 1 is a perspective view of the loading ramp constructed according to the present invention.
Figure 2:
FIG. 2 is a cross sectional view of one section of the loading ramp taken along line 2—2 of FIG. 1.

As shown in FIG. 1, the present invention generally comprises a ramp assembly 10 including a ramp 11 conformed in longitudinal cross section to substantially excite any wheel passing thereover to a vertical displacement in the form of a sine wave and forming in lateral cross section beam sections. The center of ramp 11, corresponding to the maximum amplitude of the sine wave, is supported by a fulcrum 12 which is dimensionally conformed to extend beyond the plane joining the distal ends of the ramp. Disposed on both the front and rear sections of the ramp 11 and substantially central between the fulcrum 12 and the respective free ends thereof are strain gage assemblies 13 connected by leads 14 to an electrical measuring device 15. Thus, the longitudinal and vertical dimensions of ramp 11 are dimensionally conformed to provide a predetermined amplitude and frequency of excitation to an automobile wheel 25 as it passes thereover at a preselected velocity. It is contemplated that the automobile wheel 25 progresses onto the ramp 11 while such ramp is aligned in the first stable position supported by the front section free end and fulcrum 12. Any load registered through the strain gages 13 as result of the deformation of ramp 11 is a load associated with deformation of that section only. This manner of pivoting the ramp 11 about the fulcrum 12 effectively decouples the contribution of the unloaded section of ramp 11 to the loaded section. In lateral cross section, ramp 11 forms a beam having side members 21 and 22 extending longitudinally along the distal edges of horizontal joining web 23. Members 21 and 22 can be formed as a tubular structure or as flat vertical flanges providing the mounting surfaces on which the respective strain gages 13 are disposed in complementary pairs across opposing sections of members 21 and 22, to average out any lateral asymmetries in deformation due to off-center loading by the wheel 25. The longitudinal cross section of ramp 11 is compensated for the epicyclic geometry of the wheel 25 as it travels thereover and by a first order linear corrective shaping to account for the deformation of the wheel 25 under nominal loading. These particular geometric corrections and the resulting impulse imposed on the automobile suspension as a result thereof are presented in further detail hereinbelow.

For the purposes of clarity the two stable states of ramp 11 are defined in terms of an on-loading state A and an off-loading state B, where state A supports in beam support the front section of ramp 11 designated 31, while state B forms a beam structure including the rear section designated section 32, sections 31 and 32 forming the respective halves of the ramp 11 joined at the peak to fulcrum 12. The longitudinal geometry of sections 31 and 32 is conformed generally in the shape shown in FIG. 5, defining a substantial sinusoid asymptotic at the free ends with the ground plane when placed in either stable state. The other section is cantilevered from the fulcrum 12. The fulcrum 12 extends below the plane through the extremities of the ramp sufficient to assure rocking motion when supported on a surface having normally encountered irregularities.

Figure 5:
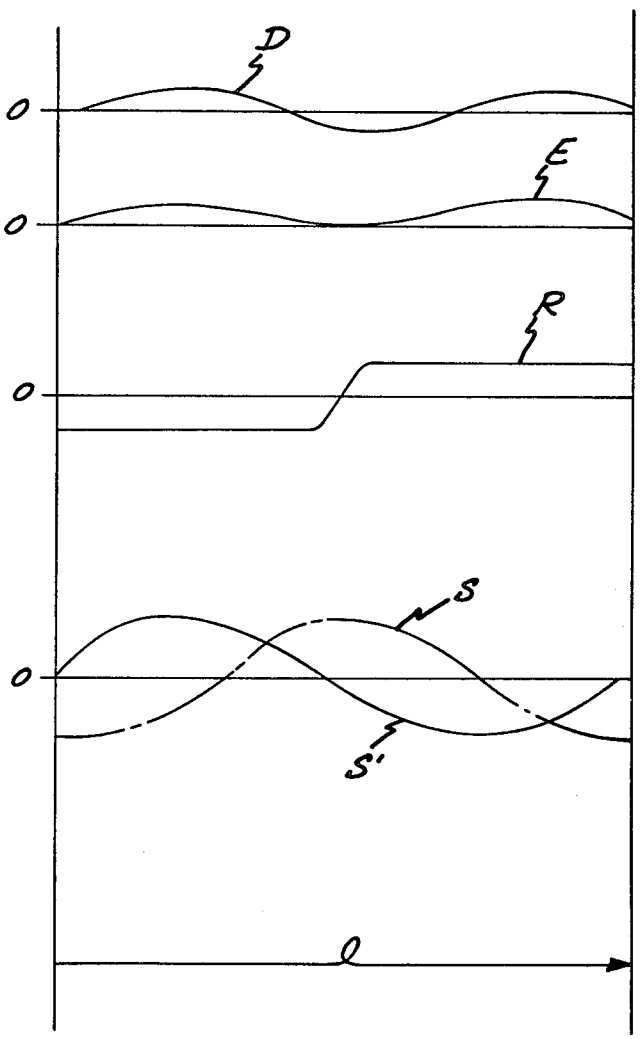
FIG. 5 is a graphical illustration of the selected first order terms superposed to define the longitudinal section of the ramp shown in FIG. 1.

As shown in FIG. 5, the ramp 11 is shaped according to curve D to compensate for the deformation of the tire on wheel 25 in response to the loading. It is to be noted that the empirical characteristics of deformation of a tire with load are substantially constant for all automobile sizes, it being commonly practiced to maintain a substantially constant relationship between the size of the tire, the pressure thereof and the weight of the automobile. These particular relationships are developed for a nominal shock absorber and deviations therefrom will accordingly be deviations from the normal. The correction for the epicyclic effect is further shown as a curve E, and the rocking motion of ramp 11 about fulcrum 12 is expressed as a corrective function R, where curves R, E and D are superposed to provide an impulse function S to the hub of wheel 25. With these first order corrections the shaping of the impulse function S of the ramp 11 reduces to a sinusoidal function at a frequency of impulsive loading which is dependent on the speed of the automobile as follows:

$$f_i = \frac{V}{l} \text{cycles/sec}$$

where V is the velocity in ft/sec and 1 is the ramp length. Thus the automobile has to be driven at a predetermined range of velocities in order to maintain the excitation $f_i$ within the frequency domain above 1 cps which typically is the fundamental body resonance, and below 20 cps which is a typical low limit for the cut-off frequency of the unsprung components of the suspension. Such cut-off frequency, or the fundamental frequency of the suspension elements in the vertical mode can be described essentially as:

$$f_o = \tfrac{1}{2}\pi \, (k/m)^{1/2}$$

where $k$ is the spring constant and m is the effective mass. This linear approximation of the spring-mass system defining the vertical fundamental mode of the suspension elements is a quadratic function having a phase relationship determined by the damping coefficient of the shock absorber. Since the physiological limitations of the human neuromuscular system are typically limited to about 1½ cycles per second having a nonlinear fixed time delay of typically 0.3 seconds, the common practice in the automotive industry is to limit such fundamental mode to the frequency range of approximately one cycle per second. Thus excitation impulses containing dominant frequency spectra in the range of 5 cycles per second should not excite the primary vibrational mode of approximately 1 cycle per second and also be sufficiently below the natural cut-off frequency of the tire-wheel combination.

From the above relationships it should be clear that the limitations on the structure of the ramp 11 must be such that the pivotal impulse of the ramp results in plate modes which are far above any frequencies effecting the loading. Accordingly, it is necessary to form the ramp 11 from structural elements which are both stiff and light in order to maintain the plate modes at sufficiently high frequency separation.

The effective shock absorber activity as result of the impulse produced by ramp 11 is shown as a differential function S' which in linear form reduces to the following expression:

$$S' = \frac{\frac{df}{dt}(S)}{dt}$$

where $$S' = \frac{d \sin 2\pi f_i t}{dt}$$

or $$S' = 2\pi f_i \cos 2\pi \, f i t$$

where $f_i$ is the frequency of excitation set forth above and $t$ is a measure of time.

Accordingly the level of excitation of the shock absorber is proportional to the frequency $f_i$ and therefore the velocity of the automobile. It is to be noted that the design performance of a shock absorber is typically nonlinear and therefore any measurements taken must be associated with a selected velocity.

Figure 3:
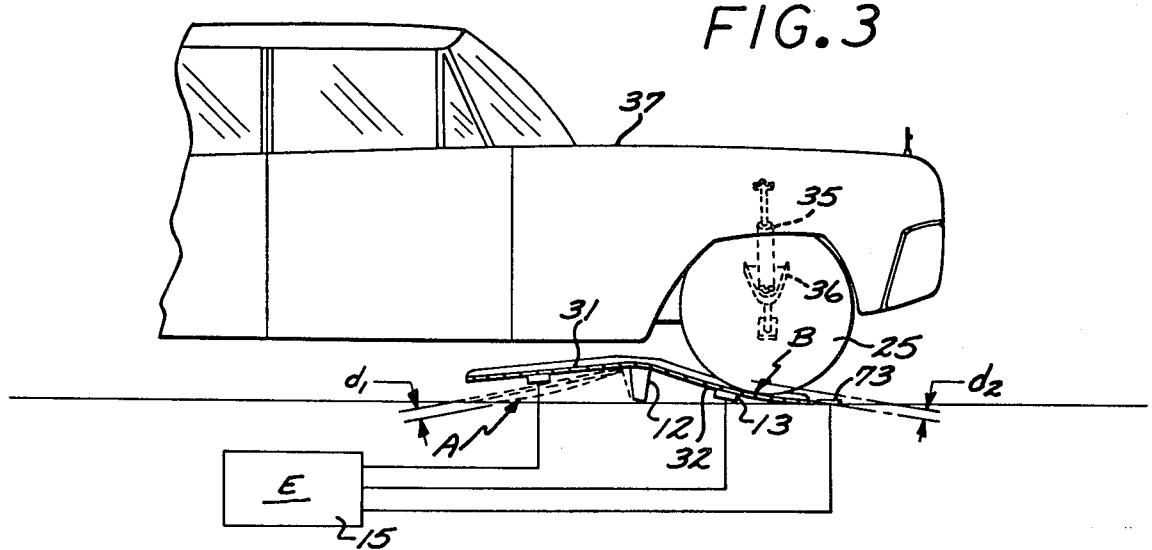
FIG. 3 is a cross sectional view taken along line 3—3 of the loading ramp of FIG. 1 showing the ramp in exaggerated deformation as it is being loaded by an automobile wheel.

The particular deformation due to loading developed of ramp 11 is shown in exaggerated form in FIG. 3. In this illustration reference is made to a shock absorber 35 being tested in combination with typical suspension elements 36 attaching wheel 25 to the frame of automobile 37. The resulting loading on ramp 11 is maximum at the approximate center of section 31 producing a peak deformation $d_1$ thereat. A secondary loading is produced on the rear section 32 resulting in a deformation $d_2$ thereat. These deformations are sensed by the strain gages 13 and collected and integrated with time in the measurement device 15 as described hereinbelow. In order to isolate the contribution of the front and rear wheels a strip switch 73 is disposed on the floor proximate the off-loading end of the ramp to be activated by the front wheel providing the requisite switching between the two integrating circuits within the device 15.

Figure 4:
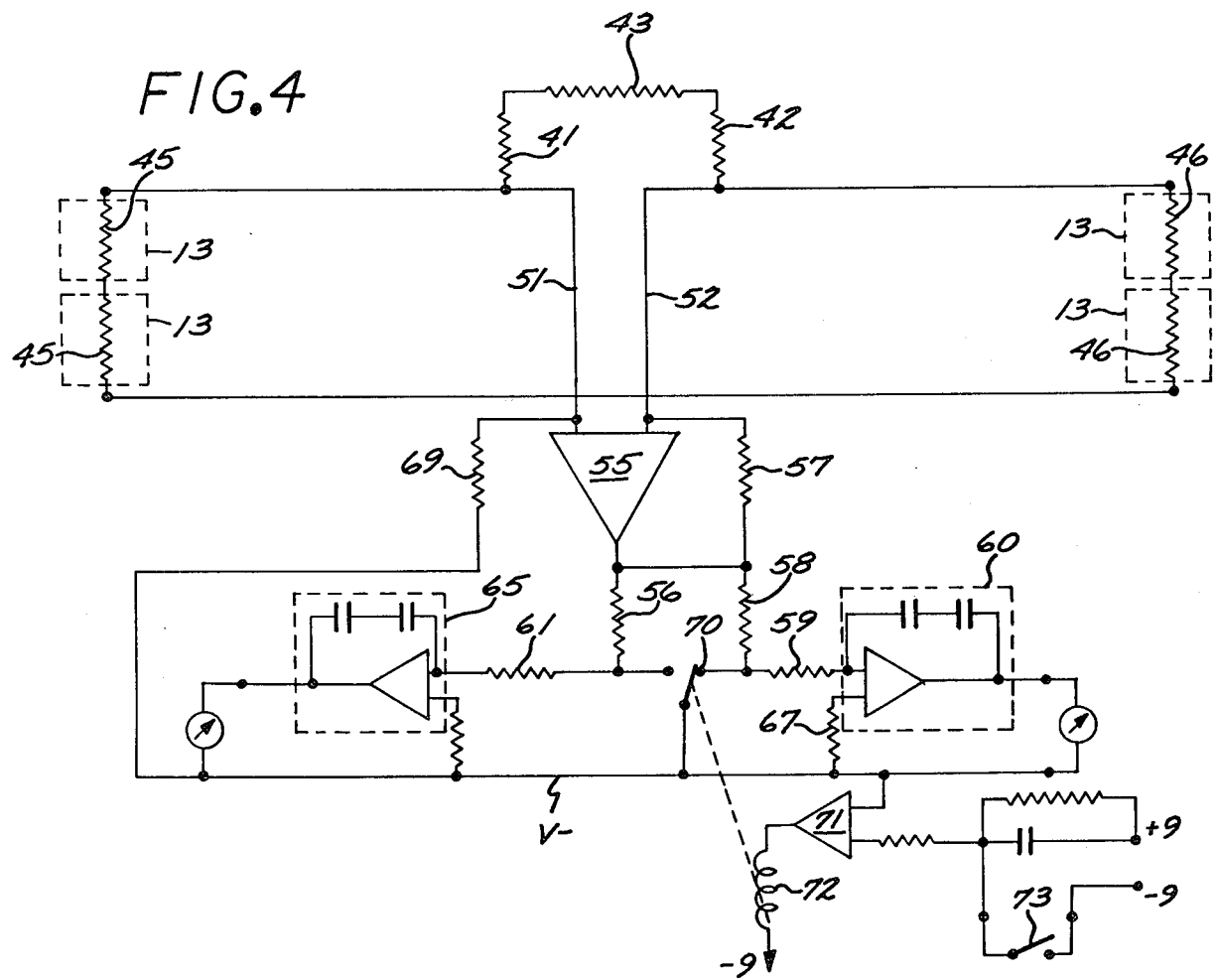
FIG. 4 is a circuit schematic of the electrical measuring equipment of the present invention.

As shown in FIG. 4, the respective strain gages 13 include resistive elements 45 and 46 for the corresponding sections 31 and 32 which in a conventional manner register the deformation history of the corresponding members 21 and 22 by a linear change in resistance. Resistive elements 45 and 46 are combined on respective halves of a resistive bridge where the laterally opposing elements of each section are in series effectively summing and therefore averaging the contribution of the respective flanges for the on-loading section 31. Since during all instances the contribution of the strain gages 13 for each ramp section 31 and 32 is essentially decoupled the respective elements 45 and 46 alternatively serve as the reference resistors of a bridge circuit against which a bridge measurement for the other elements is made. More specifically resistive elements 45 and 46 are connected in series to define the two commonly joined resistive legs of the bridge circuit. The other pair of the resistive bridge legs is formed by a three-resistor circuit including resistors 41, 42 and 43. Resistor 43 is generally configured in the form of a variable resistor or potentiometer, smaller in value than resistors 41 and 42, receiving at the wiper thereof a signal V+ which is the D.C. electrical signal exciting the bridge circuit. Resistors 41, 42 and 43 provide both the reference and the adjustment for the bridge null. The bridge balance measurement is taken by two leads 51 and 52 to the input of a conventional differential amplifier or a bridge current amplifier 55. For this purpose an integrated circuit such as the circuit conventionally designated uA 741, being respectively connected at the inverting and non-inverting input thereof to leads 52 and 51, can be utilized. Amplifier 55 at the output thereof provides a signal to resistors 56 and 58 and to a feedback resistor 57 which on the other side thereof sums up with the input lead 52. The common connection of resistors 56, 57 and 58 is furthermore fed by the resistor 58 which is series connected to a second input resistor 59. Resistors 58 and 59 provide a shunt signal switch (with switch 70) to an operational integrator 60, thus decreasing input impedance thereto to minimize drift. At the same time the output of resistor 56 is connected to a series connected input resistor 61 which provides an input to a second operational integrator 65 through the shunt signal switch 70. The other inputs to the operational integrators 60 and 65 are connected to a signal common by corresponding resistors 67 and 68. The signal common furthermore is returned by resistor 69 to the input of amplifier 55 at the input lead 51.

Disposed across the output terminals of resistors 56 and 58 is a two-position switch which at the center terminal thereof connects to the signal common and which is further activated by a relay circuit comprising an amplifier 71 driving a relay winding 72 where the amplifier 71 is tripped or powered by the strip switch 73 which when closed trips switch 70 from a connecting position with resistor 56 to a connecting position with resistor 58. Since switch 70 forms a short either across the inputs to integrator 65 or 60, it essentially forms a hold circuit for the respective integrators when so closed. Switch 73 furthermore is positioned in a conventional manner to be tripped by the front automobile wheel thereby maintaining one integrator in a hold mode while the other integrator is connected to receive the bridge unbalance. In this manner a separate reading can be made both for the front and rear wheel which provides a measurement of the loading differential across the respective sections of ramp 11 and thereby provides a measurement of the damping characteristic of the corresponding shock absorber.

As will be observed from the foregoing teachings, it is the peak level that is considered during each loading sequence. In order to obtain convenience in measuring such peak levels, in particular where a full pass is made by a car over the ramp, additional circuitry is implemented by way of this invention which incorporates peak detector circuits and counters to store separately the front and rear wheel loading without the required mechanical switching.

Figure 6:
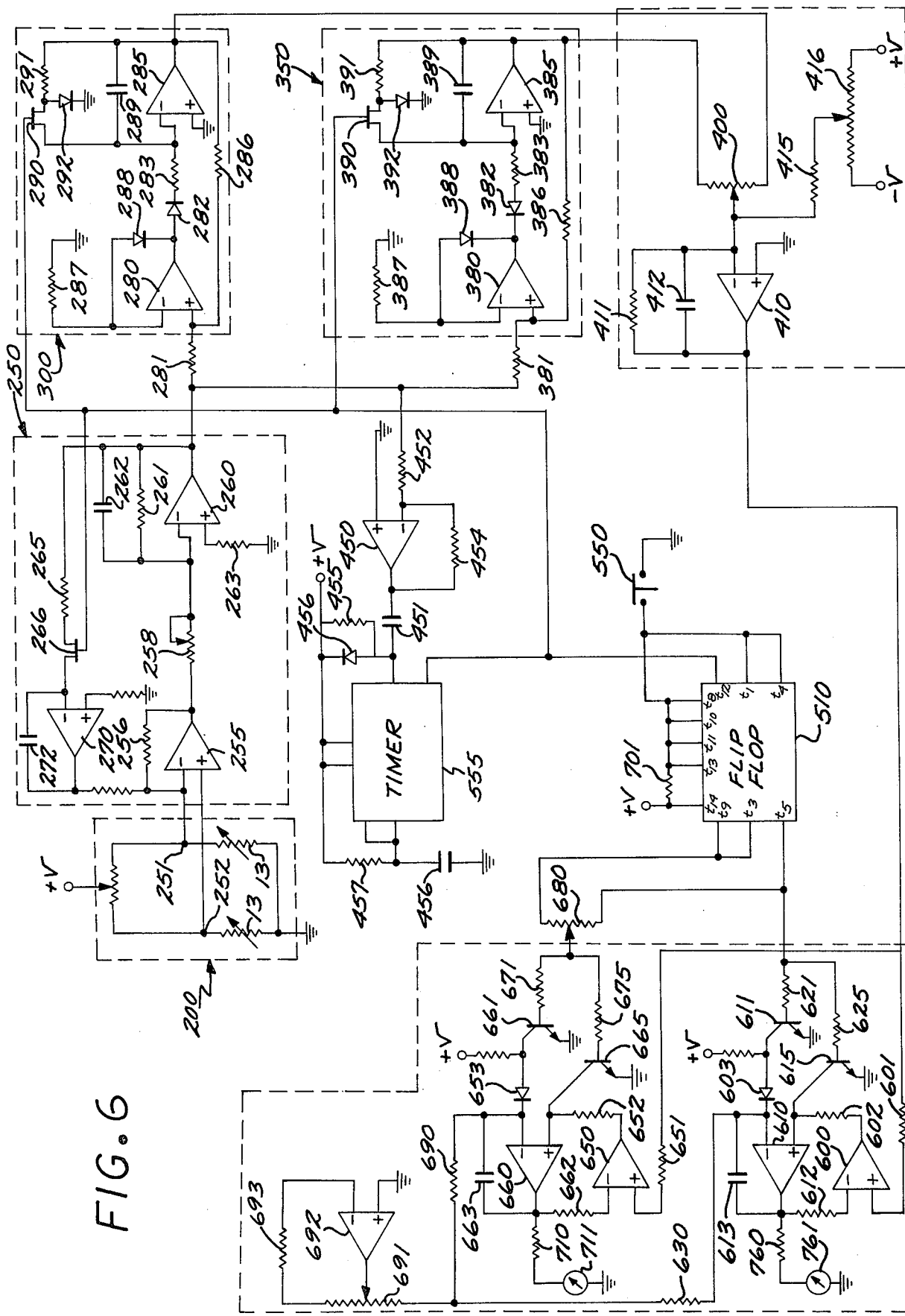
FIG. 6 is yet another circuit schematic illustrating a further embodiment of an electrical measuring system including peak detectors.

One such embodiment of an improved measuring circuit is shown in FIG. 6. In this circuit, the strain gages 13 of the front and rear sections of the ramp are again shown in the form of a bridge, generally designated as bridge 200. The bridge balance signal developed between terminals 251 and 252 is collected at the input of an operational amplifier 255 hooked up in the differential mode by this manner. Amplifier 255 is configured, by way of a feedback resistor 256, as a medium gain amplifier serving the purpose of converting the floating bridge signal to a signal referenced to ground. The output of amplifier 255 is then connected across a variable input resistor 258 to the inverting input of yet another operational amplifier 260. Resistor 258 allows for convenience in adjustment of gain through amplifiers 255 and 260 where amplifier 260 conventionally includes in its feedback a resistor 261 in parallel with a capacitor 262 provided for stage gain and low pass filtering respectively. The output of amplifier 260 is then fed back across a field effect transistor 266 in series with a resistor 265 to the input of an operational amplifier 270 configured as an integrator by way of a capacitive feedback 272. The output of amplifier 270 then is summed in with the terminal 251 to the input of amplifier 255. Amplifier 270, as configured, thus provides an automatic bridge balancing feedback during such times when the field effect transistor 266 is conducting. In this manner, a loop is formed, generally designated 250, which both balances the bridge 200 and sets gain.

The loop output, or the output of amplifier 260, is also connected across an input resistor 281 to a peak detector circuit, generally designated 300, of one polarity and across an input resistor 381 to a peak detector circuit, generally designated 350, and of another polarity. Within the peak detector circuit 300, the other end of resistor 281 is connected to the positive terminal of an operational amplifier 280 which at the negative input terminal is connected, for negative signals, across a forward biased diode 288 to its output, and across a resistor 287 to ground. The output of amplifier 280 connects, again in forward bias, for positive signals, across the diode 282 in series with the resistor 283 to the negative input terminal of yet another operational amplifier 285. Operational amplifier 285 in turn feeds back across a resistor 286 to the positive terminal of amplifier 280. An internal loop around amplifier 285 includes a feedback to the negative input terminal, formed by a feedback capacitor 289 and a feedback resistor 291. The connection between resistor 291 and a diode 292 is in turn brought back across the field effect transistor 290 to the negative input of the amplifier 285. When the field effect transistor 290 is conducting, the entire circuit 300 functions as an inverting amplifier. When the field effect transistor 290 is in a non-conducting or off condition the entire circuit 300 operates in a peak detector mode. The diode 292 in the circuit simply functions to protect the field effect transistor 290 when it is in the off condition.

Peak detector circuit 350 is similarly constructed, except that the diodes 388 and 382 are connected in opposite polarity and therefore the entire peak detector circuit responds to the opposite polarity. More specifically, circuit 350 is similarly connected across an input resistor 381 to the positive input of an operational amplifier 380, amplifier 380 including at the negative input terminal both the connection to ground across a resistor 387 and a forward bias feedback, for negative signals, across a diode 388. The output of amplifier 380 then connects in reverse bias across a diode 382 in series with a resistor 383 to the negative input terminal of an operational amplifier 385 which, similar to the amplifier 285, includes a capacitor 389 in its feedback and an output connection to ground across a resistor 391 in series with a diode 392. The common juncture between diode 392 and resistor 391 is again connected back to the negative input by way of a field effect transistor 390.

The output of amplifier 260 is furthermore connected to the inverting terminal of yet another operational amplifier 450 through an input resistor 452 into the negative terminal thereof. This terminal also receives a feedback signal from the output across a resistor 454. The output of amplifier 450 is capacitively coupled through capacitor 451 to the trigger input terminal of a timer 555, such as a standard Signetics Model 555 timer. The positive input of amplifier 450 is connected directly to ground. Amplifier 450 therefore is configured as a gain amplifier that saturates during the maximum signal excursions and functions to define the beginning of the signal sequence to start timer 555.

A resistor 455 is connected from the trigger input terminal of the timer 555 to a plus voltage line +V to provide a proper bias for this terminal. A diode 456 is connected also from the trigger terminal of the timer 555 to the plus volt line to insure that signals greater than +V signals do not enter the timer. Timer 555 is also connected to the plus volt line +V to provide power to the circuit. A resistor 457 and capacitor 456 determine the on time of the timer 555. The time out terminal of the timer 555 is connected to the gates of field effect transistors 290, 390 and 266.

Thus, the bridge signal is automatically balanced by the amplifier 270 forming the feedback or the bridge balance loop 250, and only when the time out terminal of timer 555 goes high is the bridge balance loop interrupted. Simultaneously, the resistor feedbacks of one polarity around amplifiers 285 and 385 are interrupted by the opening of the field effect transistors 290 and 390. Once the resistive feedback loop is opened, the combination of amplifiers 280 and 285, and 380 and 385, form conventional peak detectors sensing or storing the front and rear loading on the ramp. In addition, as the front loading of the ramp takes place, saturation of the amplifier circuit formed by amplifier 450 occurs which then switches to begin the time out to the timer. Upon completion of the time out, the field effect transistors are opened again to provide a bridge balance and to reset both of the peak detectors.

The respective outputs of peak detectors 300 and 350 are collected at the two distal ends of a potentiometer 400 which at the wiper terminal thereof connects to the negative input terminal of an operational amplifier 410. Operational amplifier 410 also receives at the negative input terminal across an input resistor 415 a selected voltage developed at the wiper of a potentiometer 416 which is connected between a positive and negative voltage source +V and −V. Thus, amplifier 410 provides the summing function for the peak detector voltages. To accomplish this function, amplifier 410 includes in its feedback a gain setting resistor 411 in parallel with capacitor 412, such feedback elements forming the conventional gain and bandpass functions around an operational amplifier. The positive input terminal of amplifier 410 is referenced to ground. The output of amplifier 410 is connected in parallel across corresponding input resistors 601 and 651 to the respective positive terminals of two operational amplifiers 600 and 650. Operational amplifiers 600 and 650 output across corresponding output resistors 602 and 652 to the positive inputs of two amplifiers 610 and 660 respectively, which at the negative input terminals also connect across forward biased diodes 603 and 653 to the collectors of respective transistors 611 and 661. The outputs of amplifiers 610 and 660 are respectively fed back to the negative inputs of the corresponding amplifiers 600 and 650 across input resistors 612 and 662. In addition, amplifiers 610 and 660 each respectively include a capacitive feedback, i.e., capacitors 613 and 663, thus being configured as integrators. The positive terminals of amplifiers 610 and 660 respectively connect to the collectors of transistors 615 and 665. Transistor 611, connected to the voltage source +V at the collector, and transistor 615 are switched across base resistors 621 and 625 by the $t_5$ output terminal of a dual flip-flop to be described in more detail hereinbelow. Similarly, transistors 661 and 665 connect across base resistors 671 and 675 to the wiper of a potentiometer 680 which is connected across terminals 5 and 9 of the same dual flip-flop. The negative inputs to amplifiers 610 and 660 also respectively are connected across corresponding resistors 630 and 690 to an output resistor 691 of an operational amplifier 692 which is referenced to ground. Operational amplifier 692 includes in its feedback a resistor 693 and provides the input bias to the amplifiers 610 and 660.

From the foregoing description, it should be apparent to one skilled in the art that a sample-hold and compare circuit is formed. A convenient description of such a circuit is shown in the application note AN 72 by National Semiconductor Corporation, 2900 Semiconductor Drive, Sante Clara, California 95051, in particular the descriptions occurring on pages 34 and 35 thereof. As will be observed, the sample and hold circuit disclosed herein is totally analogous to the circuit shown in such application note when one is to inspect FIG. 86 appearing on page 35 thereof. Amplifier 692 forms the auxiliary amplifier for biasing amplifiers 610 and 660 where amplifiers 610 and 660 provide the desired outputs. In particular, amplifiers 610 and 660 respectively connect across resistors 710 and 760 to readout meters 711 and 761 to display such outputs. In this circuit, when transistors 661 and 665, or 611 and 615, are receiving a + voltage base signal, the corresponding circuit is in the hold mode. Lowering either one of the transistors to 0 volts within each pair determines whether the ramp will be up or down. The slope of the ramp is a function of the input voltage to the amplifiers 650 and 600. Thus, the whole up and down sequence of the ramps developed by the above sample-hold circuit is determined by the above-mentioned dual flip-flop.

For this purpose, a two-stage flip-flop circuit 510 is provided, such as the circuit manufactured by Texas Instruments under the Model No. 74107. The $t_1$, $t_4$, $t_8$, $t_{10}$, $t_{11}$, $t_{13}$ and $t_{14}$ terminals of the dual flip-flop are all collected to the +V line through a resistor 701 and to one end of a push-to-close switch 550 which at the other end is connected to ground. Switch 550 therefore serves the function of resetting the flip-flops to begin a new sampling sequence when either the other side of the car is driven over the ramp, or when a new car is measured. The flip-flop circuit 510 is advanced to the next, or complement, memory state by the time out terminal 3 of timer 555, i.e., when the bridge balance is nulled and the peak detectors are reset following the passage of the front wheel. As has been previously stated, in order to impose wheel loading components above the automobile fundamental and below the wheel fundamental, a relationship between automobile velocity and ramp length is established where the distance ratio or passage time, between the front and rear wheels of the automobile relative the ramp dimensions is relatively large. Thus the timer 555 has to meet only very coarse timing specifications in order to switch over or time out between wheel measurements. The other elements of the circuit are all operating at time constants much shorter than the interval between wheels so that a bridge null is established and the peak detectors are nulled out ahead of the passage of the rear wheel.

In operation, the embodiment illustrated in FIG. 6 operates by detecting the peak deformations of the ramp and comparing such. Specifically, by reference to ramp states A and B, such is performed by measuring the bridge unbalance signals during front and rear loadings of the ramp by the loop 250 and storing the positive and negative peaks thereof in respective positive and negative peak detectors 300 and 350. The outputs of detectors 300 and 350 are summed for each wheel passage across the ends of potentiometer 400 and at the input of amplifier 410, which also receives a biasing input from resistor 415. Within loop 250 the first operational amplifier is a relatively low gain amplifier loop converting the bridge differential signals into a single ended signal. The automatic bridge balancing function of loop 250 is effective only during such times as the field effect transistor 266 is conducting. Similarly, the peak detecting functions of peak detectors 300 and 350 are effective only when field effect transistors 290 and 390 are not conducting. Thus, when the bridge is in its quiescent mode a bridge balance is achieved by way of the feedback loop including the amplifier 270 configured as an integrator, and when switched into the sensing modes only provides the residual last balancing voltage thereto. The output of amplifier 260 then connects to the amplifier 450 which swings from one saturation limit to the other saturation limit according to the appropriate input voltage. In this way, a sequence is initiated in the timer 555 which at the expiration hereof resets both the peak detector detector circuits and the automatic bridge balance circuit. The timing function also serves to reset the dual flip-flop 510, thereby gating the inputs of the two sample and hold circuits, respectively including amplifiers 600 and 610, and 650 and 660. The sample and hold circuits then store on meters 711 and 761 the respective front and rear wheel readings. Thus the differential peak loading measurement is derived both for the front wheel and rear wheel and is stored in separate sample and hold circuits, each connected to a meter. The manual reset switch, or puch-to-close switch, 550 then resets all of the circuits involved herein for the next succeeding pass, which could be either the next car or the other side of the same car.

In FIG. 7, a digital version of the circuit shown in FIG. 6 is disclosed. Similar to the circuit shown in FIG. 5, the ramp loading is developed by the bridge 200 which is then connected to the input terminals of amplifier 255 hooked up in the differential mode. Amplifier 255 in turn outputs to amplifier 260 which similarly includes in its feedbacks resistor 261 and capacitor 262 and includes from the output thereof a bridge balancing feedback loop rendered operative by a field effect transistor 266 and including an integrator circuit formed around amplifier 270 which connects back in to the negative input terminal of amplifier 255. As one will observe, amplifiers 255, 260 and 270 form the previously described loop 250 which receives the bridge differential from bridge 200. The output of amplifier 260 is connected to an amplifier 870 across an input resistor 871. The gain of amplifier 870 is set by a feedback resistor 872. The positive input of amplifier 870 is also connected to the output of amplifier 260 across an input resistor 869 and to the collector of a transistor 874 which is grounded at the emitter. One skilled in the art will recognize this circuit configuration around amplifier 870 as that of a polarity switching controlled by transistor 874. The output of amplifier 870 is also connected to an A-to-D, or analog-to-digital, control circuit and in this instance shown as an operational amplifier equivalent of the Motorola Model No. MC 1407 circuit and generally designated by the numeral 875. The first stage output of the A-to-D control circuit is summed with the output of an 8-bit digital-to-analog, or D-to-A, converter 880 shown in this instance as a Motorola Model No. MC 1408-8 D-to-A converter circuit. The second stage of the A-to-D control circuit 875 outputs on two leads, i.e., the positive and negative stage leads, to two NAND gates, respectively 890 and 891. NAND gate 890 is a two-input NAND gate such as the Texas Instruments NAND gate Model No. SN7400, collecting at the other input thereof a clock, or synchronization, input from a clock 900. NAND gate 891 similarly collects the other output of the A-to-D converter control circuit 875 and the clock, while further receiving at the input the output of a NAND gate 910, the function thereof to be further described hereinbelow. NAND gates 890 and 891, respectively, provide the up or down inputs to a first up-down counter 930 in series with a second up-down counter 940, counters 930 and 940 being conformed as Texas Instruments Model No. 74193 4-bit up-down counters, each providing a 4-bit output and forming together an 8-bit up-down counter. Thus, up-down counters 930 and 940, in combination with the D-to-A control 875 follow the analog voltage of amplifier 870 with corresponding digital words at the output thereof.

The output of amplifier 260 is furthermore connected to a positive and negative comparator, respectively 950 and 955, where the output of the positive comparator 950 connects across a capacitor 951 to the input of a timer which in this case is the identical timer 555 used in FIG. 6. The output of comparator 950 is collected with the output of comparator 955 at the input of the above-referenced NAND gate 910, the NAND gate therefore being a conventional two-input NAND gate such as the Texas Instruments NAND gate Model No. SN7400. At the same time, comparator 955 is connected across a resistor 873 to the base of transistor 874. Transistor 874, connected to the positive input terminal of amplifier 870 at the collector thereof, effects polarity switching of amplifier 870 to the input of control circuit 875 according to the state of comparator 955.

The two 4-bit outputs of up-down counters 930 and 940 are side loaded in parallel to the D-to-A converter 880 which in turn returns the analog signal back to the control 875. This analog signal then sums out, or cancels, the input to the second stage of control 875 if and when a proper count is arrived at. In addition, the 4-bit outputs of counters 930 and 940 are also loaded in parallel to two D-type four stage latches 970 and 980, respectively, D-latch 970 receiving the bits from the up-down counter 930, or the less significant bits and the D-latch 980 receiving the most significant bits from the up-down counter 940. Latches 970 and 980 are conventional in all respects and can be formed from circuits such as the Texas Instruments circuits Model No. SN7475, primarily used for data storage applications, and are enabled by the signal from the positive comparator 950. The data stored in latches 970 and 980 is then brought down to the subtrahend terminals of two subtractors, respectively 990 and 995. The minuend terminals of subtractors 990 and 995 are, in turn, connected to the respective outputs of counters 930 and 940. Thus on the way up latches 970 and 980 are enabled by comparator 950. When comparator 950 goes low, latches 970 and 980 are disabled and will therefore store the highest count recorded, in the manner of a peak detector. Subtractors 990 and 995 therefore receive the peak positive load level at the subtrahend terminals and subtract therefrom the subsequently occurring lower levels of the return stroke. According to this function, only conventional arithmetic operation is required and for that reason Texas Instruments Model No. SN74181 arithmetic circuits are selected.

The 8-bit parallel code from subtractors 990 and 995 is brought out in groups of four bits to corresponding binary coded decimal, or BCD, decoders 1010 and 1015, which pass selected leads thereof to yet another binary-to-decimal decoder 1020. Decoders 1010, 1015 and 1020 are again conventional Texas Instruments Model No. SN74185 decoders. The collected outputs from decoders 1010, 1015 and 1020 are then collected at four latches 1025, 1030, 1035 and 1040. Latches 1025 and 1030 are enabled in common by the high output signal of a NAND gate 1070 while latches 1035 and 1040 are enabled by the output of a NAND gate 1075. Gates 1070 and 1075 respectively receive at one input thereof the Q and Q outputs of a flip-flop 1080, such as Texas Instruments Model No. SN74107, which in turn is toggled by the comparator 955 and is set by the output of the timer 555. The other inputs to NAND gates 1070 and 1075 is also the comparator 955 output.

Latches 1025, 1030, 1035 and 1040 are again Texas Instruments Model No. SN7475, storing the binary code, or the decimal code, for the up-down counter readings. The outputs of the latches are then brought into a bank of 7-segment drivers, such as Texas Instruments Model No. SN74471 drivers, herein designated by the numerals 1140, 1145, 1150 and 1155. The drivers 1140-1155 then, by conventional methods, illuminate 7-segment displays shown as a bank of 7-segment displays 1090, such as the Litronix DL-707 LED displays.

In this manner, a digital technique is provided by which the up-down counters follow the analog input voltage through the loop including the control 875 and the D-to-A converter 880. When the wheel approaches the front face of the ramp, the output of the bridge goes positive causing the positive voltage comparator to react, i.e., comparator 950. This then presets the flip-flop 1080 by way of timer 555 and places the A-to-D converter into a positive peak detect mode by inhibiting the down counting signals. The output of the up-down counters 930 and 940 therefore can only change if a new input is greater than the old input. Concurrently, the timer blocks the automatic bridge balancing function of amplifier 270 by rendering the field effect transistor 266 nonconductive. When the wheel passes from the front face to the rear face of the ramp, the bridge signal crosses 0 voltage, causing the positive comparator to release which in turn releases the peak detector function, allowing the counters to count down while the latches 970 and 980 store the last value thereon. When the wheel passes onto the negative, or the rear, face of the ramp, a negative signal operates the negative comparator 955 causing the polarity switching amplifier 870 to operate by way of providing excitation to the base of transistor 874. When the negative comparator is high, the front wheel display latches are enabled and will follow the output of the subtractor. When the wheel leaves the rear face of the ramp, the bridge output returns to 0, which toggles the flip-flop 1080 to prepare the rear wheel display to accept information. When the rear wheel hits the ramp, the process repeats itself to store the data in a similar manner.

Some of the many advantages of the present invention should now be readily apparent. The invention provides, by way of conventional circuit elements, an automatic system implementing the features of the parent application above, thus further simplifying the task of checking shock absorbers.

Obviously, many modifications and variations of the present invention may be made with regard to the foregoing detailed description without departing from the spirit of the invention.

We claim:
1. In a shock absorber testing device including a ramp adapted to induce sinusoidal excitations to the wheels and the supporting structure therefor of an automobile driven thereover, said ramp further comprising electrical measuring means for producing a first electrical signal indicative of the wheel loading of a first section thereof and a second electrical signal indicative of the wheel loading of a second section thereof, the improvement comprising:
first peak detecting means adapted to receive said first electrical signal for producing a first peak signal indicative of the maximum amplitude thereof;
second peak detecting means adapted to receive said second electrical signal for producing a second peak signal indicative of the maximum amplitude thereof;
comparing means connected to receive said first and second peak signals for producing an output signal indicative of the difference therebetween; and
display means connected to receive the output signal from said comparing means for producing a visual display indicative of the difference output signal produced by said comparing means.

2. Apparatus according to claim 1 further comprising:
reset means connected to said first and second peak detecting means for selectively resetting such said peak detecting means; and
timing means connected to said electrical measuring means and said reset means for enabling said reset means a predetermined period after said measuring means produces said first and second electrical signals.

3. Apparatus according to claim 2, wherein:
said comparing means includes an operational amplifier; and
said first and second peak signals are of opposite polarity.

4. Apparatus according to claim 3, wherein:
said first and second peak detecting means include respectively a first operational amplifier circuit operative in a rectifying mode of a first polarity, a second operational amplifier circuit operative in a rectifying mode of a second polarity, and third and fourth operational amplifier circuits operative as peak detectors respectively connected to said first and second operational amplifier circuits, said third and fourth operational amplifier circuits being connected to the input of said comparing means.

5. Apparatus according to claim 4, further comprising:
flip-flop means connected to said timing means for switching over from a first state to a second state when said timing means enables said reset means.

6. Apparatus according to claim 5, wherein:
said display means includes a first display circuit enabled by said first state signal from said flip-flop means and a second display circuit enabled by said second state signal from said flip-flop means, said first and second display circuits producing a first and second visual display indicative of the passage of the front and rear wheels of said automobile.

7. Apparatus according to claim 1, further comprising:
analog-to-digital converting means connected to receive said first and second electrical signals for producing a first and second digital signal corresponding to the amplitudes thereof.

8. Apparatus according to claim 7, wherein:
said first peak detecting means and said second peak detecting means comprise an up-down counter; and
said comparing means comprises an adder.

9. Apparatus according to claim 8, wherein:
said display means includes decoders connected to receive the output signals from said adder for producing a coded signal indicative thereof, and digital readout means connected to said decoders for producing a digital visual display corresponding to said coded signal.

10. Apparatus according to claim 9, further comprising:
switch over means connected to said measuring means for enabling said adder when said measuring means transitions from said first to said second electrical signal.

11. A shock absorber testing device including a ramp to induce sinusoidal excitations to the wheels of an automobile passing thereover, comprising:
bridge balance means connected to sense the deformations of said ramp for producing a first and second electrical signal respectively indicative of the deformations of a first and second section thereof, said bridge means including bridge nulling means for maintaining a null signal when said ramp is not loaded;
first peak detecting means adapted to receive said first electrical signal for producing a first peak signal indicative of the maximum amplitude thereof;
second peak detecting means adapted to receive said second electrical signal for producing a second peak signal indicative of the maximum amplitude thereof;
comparing means connected to receive said first and second peak signals for producing an output signal indicative of the difference therebetween; and
display means connected to receive the output signal from said comparing means for producing a visual display indicative of the difference output signal produced by said comparing means.

12. Apparatus according to claim 11 further comprising:
reset means connected to said first and second peak detecting means for selectively resetting such said peak detecting means; and
timing means connected to said bridge balance means and said reset means for enabling said reset means a predetermined period after said bridge balance means produces said first and second electrical signals.

13. Apparatus according to claim 12, further comprising:
null disabling means connected to said timing means and said bridge nulling means for disabling said bridge nulling means when said timing means enables said reset means.

* * * * *